United States Patent Office 3,451,537
Patented June 24, 1969

3,451,537
PRESSURE-SENSITIVE ADHESIVE TAPE
Charles R. Freeman, Lincoln Township, Washington County, Minn., and Charlotte I. Sauer, North St. Paul, Minn., assignors to Minnesota Mining and Manufacturing Company, St. Paul, Minn., a corporation of Delaware
No Drawing. Filed Feb. 28, 1966, Ser. No. 530,337
Int. Cl. B65h 55/00
U.S. Cl. 206—59                                          10 Claims

ABSTRACT OF THE DISCLOSURE

Normally tacky and pressure-sensitive adhesive tape which can be applied at temperatures as low as −30° C. and which when applied function effectively from −30° C. to +105° C. The adhesive is a reacted blend of rubbery polymer, tackifying resin, and curing agent, the rubbery polymer at least preponderantly comprising 1,4-polybutadiene having over 95% cis configuration.

---

This invention relates to normally tacky and pressure-sensitive adhesive tapes and is especially concerned with tapes displaying outstanding adhesion at a wide range of temperatures.

A preferred embodiment of this invention is a roll of electrical insulating tape which can be unwound and applied at temperatures from at least as low as −30° C. to at least as high as +30° C., remaining firmly adhered and functional throughout the range of −30° C. to +105° C.

A major breakthrough in the field of electrical insulating occurred with the invention of Oace et al. as described in U.S. Patent No. 2,559,990, reissued as 23,843, where a relatively thick but easily stretchable and highly elastic pressure-sensitive adhesive tape having a plasticized vinyl chloride polymer film backing was first taught. This product made obsolete the inconvenient and less satisfactory technique of wrapping electrical conductors with vinyl chloride film and overwrapping with conventional friction tape. In 4- to 20-mil. thickness the Oace et al. product can be stretched at least 50% by simple hand pulling, and it substantially completely retracts from an elongation of 30%. Such tapes are in wide use today, particularly when applied at temperatures above about 50° F. (10° C.).

Bond et al. U.S. Patent 3,129,816 discloses an improved electrical insulating tape wherein a plasticized vinyl chloride film backing and a pressure-sensitive adhesive coating are correlated to provide a product which is even more stretchable and retractable than that of Oace et al. and which is useful at a wider range of temperature when that for which the Oace et al. product was suited. The Bond et al. product displays outstanding ease of application at a wide range of ambient temperatures and excellent electrical performance at temperatures from −20° C. to 87° C. and higher, greatly increasing the range of application for which electrical insulating tape can be employed.

The need for an electrical insulating tape having a still wider range of operating temperatures, especially low temperatures, has long existed, e.g., for the use of telephone lineman in Canada and the northern part of the United States, where conductors must often be taped at temperatures as low as −20° F. (−29° C.) during the winter. Although it is relatively easy to make a tape having a soft adhesive which displays good adhesion to electrical conductors at temperatures below 0° F. (−18° C.), all such prior art products have proved soft, weak, and unsatisfactory at temperatures of 80° C., or even lower, to which insulated conductors are subjected in many electrical installations. Prior art tapes made with relatively firm adhesive function well at high temperatures but are extremely difficult even to unwind from a roll at low temperatures; and after unwinding it is almost impossible to re-adhere the tape to a cold conductor which is to be insulated.

The invention provides, for the first time, it is believed, an organic, based pressure-sensitive tape product which can be readily unwound at −30° C., e.g., at 12 inches (30 cm.) per minute by the application at a force of less than 8 pounds per inch (1.5 kg./cm.) of width, and which provides useful performance at least throughout the range of −30° C. to +105° C.

The exceptional performance characteristics obtained by the tape of this invention are attributed to a novel normally tacky and pressure-sensitive rubber-resin adhesive which comprises rubbery polymer consisting essentially of 1,4-polybutadiene having over 95% cis configuration[1]. It is not understood why this polymer should be so effective in preparing adhesives which are useful over wide temperature ranges, particularly since neither other polybutadienes nor other rubbery cis polymers appear to be similarly useful in the preparation of adhesives which function effectively at both low and high temperatures. Also included in the formulation are 60–150 parts of compatible tackifying resin system and an effective amount of cross-linking agent. The adhesive may also contain fillers, pigments, plasticizers, antioxidants, accelerators, minor amounts of other rubbery polymers, or other additives.

In addition to the tackifier described in Example 1, we have also successfully employed esters of rosin, commercially available from Hercules Powder Co. under such trade designations as "S-994" and "Pentalyn H," chlorinated diphenyls and polyphenyls commercially available from Monsanto Chemical Co. under such trade designations as "Aroclor 4465" and "Aroclor 5460;" hydrogenated rosin available from Hercules Powder Co. such as "Staybelite;" and petroleum resins, largely aromatic, available from Pennsylvania Industrial Chemical Corp. under such trade designations as "Picco 6100–3" and "Picco 6120–3." It is preferred to use resins which have softening points above 85° C., at least as the major portion of the tackifying resin system, to avoid obtaining excessively soft adhesives which have less desirable high temperature properties. The chlorinated polyphenyl resins tend to migrate into plasticized vinyl film backings, decreasing the tackiness of the adhesive coated on such backings after aging; such tackifiers are therefore preferably utilized either in combination with other tackifying resins, or in adhesives coated on backings other than vinyl. Systems which include a tackifier having slightly less than perfect compatibility with the polybutadiene rubber, as evidenced by a slightly cloudy appearance seem to promote excellent, long lasting tack and adhesion values, but tend to cause some discoloration of the inner layers of a roll of tape made on plasticized vinyl backing if used in excessive amounts. Resins which impart excessive cloudiness or opacity when blended with equal parts of a rubber and cast as a film on a clear glass plate, are generally ineffective as tackifiers.

The specific amount of tackifier employed can vary between 60 and 150 parts per 100 parts of polybutadiene; 80 to 110 parts have proved particularly satisfactory. Generally speaking, it is desirable to utilize a minimum amount of tackifier consistent with acceptable adhesion values in order to promote smoothness of unwind and to minimize leaching of the adhesive in oils to which the tape may be exposed in actual operation.

The phenol-formaldehyde resin functions primarily as

---

[1] See method of analysis described in Analytical Chemistry, vol. 31, No. 4 (April 1959), pages 529–532.

a crosslinking agent which serves to improve the firmness of the pressure-sensitive adhesive by crosslinking the polybutadiene rubber. Although a lesser amount would be stoichiometrically adequate for crosslinking the rubber, polybutadiene requires more vigorous reaction conditions than many other rubbers to achieve a comparable degree of vulcanization, and hence at least about 10 parts of phenol-formaldehyde resin per 100 parts of rubber should be ordinarily employed to reduce the time and temperature of curing. More than 35 parts per 100 parts of rubber does not seem to have any additional salutary effect, and if so much resin is added that it is no longer compatible, adhesive properties are actually diminished. Other conventional crosslinking agents, such as peroxides and sulfur-containing compounds, many of which are effective in both lower quantities and shorter times, may be employed, but the phenol-formaldehyde resin imparts such additional desirable properties as oxidation resistance. Where the product is to be employed in electrical insulation, it is desirable to avoid sulfur-containing curing agents, which tend to corrode electrical components.

Certain tests, which are widely used in the tape industry to evaluate performance, are described in succeeding paragraphs.

The firmness, or internal strength, of a normally tacky and pressure-sensitive adhesive may be measured by placing two ½ inch (1.27 cm.) wide strips of a backing material coated with the adhesive, in face-to-face relationship so that they overlap each other by ½ inch (1.27 cm.), resulting in a mutual adhesive contact area ½" x ½" (1.27 cm. x 1.27 cm.). The two strips are pressed by rolling with a weighted roll in a standard manner and then tensioned by applying a constant force of 1,000 grams to the free ends of the two strips. The time for the face-to-face bond to fail, by sliding apart, is a measure of the internal strength of the adhesive. Four hours or more after being made, vinyl tapes having a pressure-sensitive adhesive with adequate internal strength require at least 10 minutes, and preferably at least 30 minutes, to fail at room temperature. Preferred adhesives tend to become stronger as they age, increasing sharply over the first few hours and gradually thereafter. Other adhesives, which may soften by absorbing plasticizer from a vinyl backing, actually decrease in strength, and are satisfactory for use only on unplasticized backings.

The adhesive nature of a normally tacky and pressure-sensitive adhesive may be qualitatively determined by coating a thin film on a glass plate, evaporating the solvent, and checking its "thumb appeal." A more quantitative measurement of tackiness may be made in accordance with ASTM Test D1000. Sheet material, preferably 1-mil (0.025 mm.) biaxially oriented polyethylene terephthalate film which has been primed by coating with crude rubber and exposure to ultraviolet light, is provided with a 1.3-mil (0.033 mm.) coating of adhesive. A 1-inch x 10-inch (2.5 cm. x 25 cm.) strip of the resultant product is thereafter placed adhesive face down on a smooth horizontally disposed stainless steel plate, 5 inches (12.5 cm.) extending beyond one end of the plate. The strip is then forced into adhesive contact with the plate by passing a hard rubber roller thereover. The free end of the strip is doubled back on itself at 180°, peeled away for about an inch, and clamped in the upper jaw of a tensile tester, the exposed end of the steel plate being clamped in the lower jaw. The jaws of the tensile machine are then separated at a rate of 12 inches (30.5 cm.) per minute, the scale reading being a measure of the adhesion to the steel. Where the adhesive is coated on primed polyester film, adequate adhesion is deemed to be at least 20 ounces, and preferably at least 40 ounces, per inch of width (225–450 gms./cm.) when measured at the temperature in which it is to be applied. If the reading varies erratically, e.g., more than ±20 ounces per inch of width, the adhesive is considered harsh and less desirable than where the reading is more uniform.

A qualitative, but simple and highly reliable, test which may be used to evaluate the tackiness of an adhesive, or the adhesive character of a pressure-sensitive tape, at any given temperature involves forming a loop of tape, e.g., 1 inch in diameter, with the adhesive side out. The tape is then grasped at one point on the loop and the diametrically opposite location on the loop is brought lightly into contact with a 2-inch x 5-inch (5 cm. x 12.5 cm.) steel plate having a No. 4 finish, and weighing approximately 95 grams, both the tape and the steel plate being at the temperature desired. Adhesion is considered excellent if the tape will completely lift the steel plate, good if it will lift only one end, and poor if it will not lift the plate at all.

The unwind characteristics of a roll of tape at various temperatures may be determined by either simply attempting to unwind the tape at various rates without breakage or undue stretching and subjectively checking the "feel," or more quantitatively by using a tensile tester to measure the actual force required to unwind a roll of tape mounted on a ball bearing support at the rate of 12 inches (30.5 cm.) per minute. If the force required exceeds 8 pounds per inch (1.5 kg./cm.) of width, the tape will be extremely difficult to use at the particular temperature where such force is required. If the tensile reading varies more than about ±10 ounces per inch (100 gms./cm.) from the average, the unwind is considered harsh, indicating the likelihood of breakage. Smooth unwind characteristics are greatly preferred.

The invention will now be described with the aid of certain illustrative but non-limitative examples, in which all parts are by weight unless otherwise noted.

EXAMPLE 1

To a Baker-Perkins mogul mixer was charged 500 lbs. (226 kg.) of 1,4-polybutadiene produced by a cobalt catalyst of the Ziergler Type, having approximately 98% cis configuration, and an ML4 Mooney viscosity of about 41 at 100° C. (212° F.) according to ASTM Test D1646–62 (commercially available from Goodrich-Gulf Chemicals, Inc. under the trade designation "Ameripol CB 220"). The mixer was then started, and 200 lbs. (91 kg.) of a polyterpene resin which is a polymerized blend of α- and B-pinene having a ball-and-ring melting point of 115° C. (commercially available from Hercules Powder Co. under the trade designation "S–1010") added in 25-lb. (11.4 kg.) increments every 8 minutes. Next 275 lbs. (125 kg.) of a second polyterpene resin, having a melting point of 115° C. and a zero acid number, essentially a polymer of beta pinene (commercially available from the Pennsylvania Industrial Chemical Corp. under the trade designation "Piccolyte S–115") was added in similar incremental manner. The friction of mixing having elevated the batch temperature to 275° F. (135° C.), steam was then introduced into the mogul jacket to further heat the batch to 295–300° F. (145–150° C.), and 100 lbs. (45.5 kg.) was added of an oil-soluble heat-reactive solid para-tertiary butyl phenol-formaldehyde resin made with an alkaline catalyst and between 1.5 and 2.0 mols of formaldehyde for each mol of substituted phenol (available commercially from Union Carbide Corporation under the trade designation "CKR 1634"). Mixing was continued for an additional 50 minutes, after which the reaction was stopped by adding 275 lbs. (125 kg.) of Dry Ice. A total of 2,325 lbs. (1,055 kg.) of heptane, 50 lbs. (22.6 kg.) of dioctyl phthalate, and 50 lbs. (22.6 kg.) of ethanol was then added incrementally. The finished adhesive contained 33% solids and had a viscosity of 10,000 cps. at room temperature.

When coated on UV-treated crude rubber-primed biaxially oriented polyethylene terephthalate and applied to steel as previously indicated, stripback adhesion was found to be 52 ounces per inch (580 gms./cm.) of width. Four hours after the adhesive had been coated on polyester film, the internal strength was measured as previously described herein, and found to be 93 minutes. Both of these figures are considered highly acceptable.

A 7.5-mil (0.19 mm.) foil of plasticized 97:3 vinyl chloride:vinyl acetate copolymer prepared in accordance with Example 2 of Bond et al. U.S. Patent 3,129,816 (the disclosure for which preparation is incorporated herein by reference) and primed by coating it on one surface with an extremely thin layer of an aqueous emulsion containing essentially 510 parts deionized water; 1 part 29% NH$_4$OH solution; 10 parts polyethylene glycol alkyl ether (available commercially from Union Carbide Corp. under the trade designation "Tergitol TMN"), as a wetting agent; 162 parts butadiene:acrylonitrile rubber latex (available commercially from Goodyear Chemical Co. under the trade designation "Hycar 1552"); and 168 parts of an aqueous emulsion of polyterpene resin made from beta-pinene. (The emulsion is made in accordance with Smith U.S. Patent 3,232,785,[2] appropriate disclosures from which are incorporated herein by reference.) The water was then evaporated from the emulsion by heating gradually to 230° F. (110° C.) over a 7-minute period.

The adhesive solution described previously in this example was then knife-coated on the primed surface of the film, a 7-mil (0.18 mm.) orifice being provided between the knife blade and the surface of the primed film. The adhesive coated web was passed through circulating air-drying ovens maintained at 150° F. (65° C.), 175° F. (80° C.) and 230° F. (110° C.), remaining about 80 seconds in each oven, to leave a dried adhesive thickness of 1.3 mils (0.33 mm.). The tape was wound into rolls and slit to ¾ inch (1.9 cm.) width. Initial adhesion to steel was 22 ounces per ¾ inch (330 gms./cm.) and the internal strength value was 19.4 minutes. After seven days conditioning in roll form at 150° F. (65° C.), the adhesion to steel was 16 ounces per ¾ inch width (240 gms./cm.), and the internal strength value had increased to 250 minutes. After being stored in roll form for 2½ hours at 0° F. (−18° C.), the tape was readily and smoothly unwound from the roll and was found to be capable of lifting a clean 95-gram No. 4-finish stainless steel plate (also stored at −18° C.) upon only contact pressure. Adhesion to steel at −18° C. was found to be 62 ounces per ¾ inch (930 gms./cm.). After being conditioned for two hours at −20° F. (−29° C.), a loop of tape was able to pick up a 95-gram steel plate, the adhesion to steel being 50 ounces per ¾ inch (750 gms./cm.). The tape could be unwound from the roll at medium speed, but extremely fast stretching caused breakage of the backing. When subjected to the 60-day 113° C. Weston splice test specified by Underwriters' Laboratories, this tape showed no sign of failure. To the best of our knowledge and belief, there has never heretofore existed tape which could be satisfactorily employed at this low temperature and equally satisfactorily employed at temperatures 105° C. and higher. In fact, with the exception of tapes made in accordance with the said Oace et al. or Bond et al. patents, we are unaware of any competitive product which will adhere to metal at 0° F. (−18° C.) and yet display an internal strength of even 5 minutes at room temperature.

A ¾-inch roll of tape of this example was brought to equilibrium in a "cold room" at 0° F. (−18° C.), tested for unwind and adhesion, the room reset to −10° F. (−23° C.), less than ten minutes being required to reach equilibrium, and the tests repeated. Further tests were run, in the same manner, at −20° F. (−29° C.) and −26° F. (−34° C.).

| Storage time | Temperature | Unwind | Tape loop adhesion [1] | Adhesion to steel, ozs. per ¾ inch [1] |
|---|---|---|---|---|
| 2 hrs | 0° F. (−18° C.) | Smooth | Excellent | 60 (900 gms./cm.) |
| 45 min | −10° F. (−23° C.) | do | do | 72 (1,080 gms./cm.) |
| 65 min | −20° F. (−29° C.) | Smooth 73 oz. (1,090 gms./cm.) | do | 32 (480 gms./cm.) |
| 20 min | −26° F. (−32° C.) | Smooth 72 oz. (1,080 gms./cm.) | do | 10 (150 gms./cm.) |

[1] Steel at the same temperature as the tape.

The adhesion at −26° F. (−32° C.) is high enough to provide a useful tape product, but is considered borderline.

Vinyl tapes are frequently used to spirally wrap pipes which are buried underground and hence susceptible to corrosion. For this purpose, it is extremely important that the adhesive be water-resistant since otherwise it forms a bridge through which corrosive chemicals in the soil can reach and attack the pipe. It has been found that the weight gain of tape immersed in dilute NaOH is inversely related to its effectiveness for pipe wrapping. After being immersed for one week in 100 c. of water containing 10 drops of saturated NaOH solution, a ¾-inch x 6-inch (1.9 cm. x 15.4 cm.) strip of tape made in accordance with Example 1 had gained 3.99% in weight. Anything below 5% is considered extremely satisfactory.

Insulation resistance of tape made in accordance with Example 1 was measured and found to exceed $10^6$ megohms. This is considered extremely good.

EXAMPLE 2

Using the same procedure as in Example 1, an adhesive was prepared from the following components:

| | |
|---|---|
| "Ameripol CB 220" | 100 |
| Hercules "S-1010" | 50 |
| "Piccolyte S-115" | 20 |
| "CKR-1634" | 35 |
| Dioctyl phthalate | 10 |
| Ethanol | 10 |
| Heptane | 500 |

When coated on primed polyester film, the ASTM adhesion to steel at room temperature was 26 ounces per ¾ inch (390 gms./cm.). When coated on the primed vinyl backing used in Example 1 to leave a dry adhesive film 1.3 mils thick, the internal strength was found to be 24.5 minutes. The force to unwind a roll of ¾-inch tape at 0° F. (−18° C.) was 50 ounces (750 gms./cm.). The tape loop adhesion test showed the adhesion to steel at this temperature to be excellent. When conditioned for 2 hrs. at 0° F. (−18° C.) and applied to steel at that temperature, adhesion values averaged 58 ounces per ¾ inch (590 gms./cm.), ranging from 48 to 67 ounces (720–1,000 gms./cm.). This uniformity, which is highly desirable, is typical of adhesives containing a minimum amount of tackifier.

EXAMPLE 3

Example 2 was repeated with the sole difference that the amount of "S-1010" tackifier was increased to 115 parts. When coated on primed polyester film, the ASTM adhesion to steel at room temperature was 42 ounces per ¾-inch (630 gms./cm.). When coated on the primed

---

[2] As disclosed in this patent, the primer consists essentially of (a) a water-insoluble acrylo polymer, (b) a material selected from the group consisting of a conjugated diene rubbery polymer in the amount of 0.3 to 4 parts per part of said acrylo polymer and a tackifying resin in the amount of from about 0.3 to 10 parts per part of said acrylo polymer, (c) about 2–30 parts per 100 parts of rubbery polymer present from (a) and (b) in said primer layer of a water-soluble organic wetting agent containing in the molecule thereof a hydrophilic group and a non-linear hydrophobic group.

vinyl film backing of Example 1 so as to leave a dry adhesive film 1.2 mils (0.30 mm.) thick, the internal strength was found to be 13.7 minutes. The force to unwind a roll of ¾-inch tape at 0° F. (−18° C.) was 74 ounces (1,100 gms./cm.). Tape loop adhesion to steel at 0° F. (−18° C.) was excellent; the measured average was 58 ounces per ¾ inch (860 gms./cm.), but the values ranged from 17 to 96 ounces (250–1,430 gms./cm.). Although satisfactory, this tape illustrates the effect of relatively large amounts of tackifying desin, viz., an increase in difficulty of unwind and a tendency toward a "harsh" feel, which indicates a susceptibility to breakage while being unwound at lower temperatures.

EXAMPLE 4

An adhesive was formulated in the same manner as in Example 2, the formulation differing in that the amount of "S–1010" tackifier was 80 parts and that 10 parts of a rubbery polystyrene-terminated block copolymer of styrene and butadiene (available commercially from Shell Chemical Co. under the trade designation "Kraton 101") was added. When coated on primed polyester film, the ASTM adhesion to steel at room temperature was 26 ounces per ¾ inch (390 gms./cm.). When coated on the primed vinyl backing of Example 1 so as to leave a dry adhesive film 1.3 mils (0.33 mm.) thick, the internal strength was found to be 35.0 minutes. The force to unwind a roll of ¾-inch tape at 0° F. was 67 ounces (1,000 gms./cm.). Tape loop adhesion to steel at 0° F. (−18° C.) was excellent. The measured adhesion to steel averaged 75 ounces per ¾ inch (1,120 gms./cm.), ranging from 54 to 96 ounces (800–1,430 gms./cm.). Although somewhat harder to unwind and harsher in feel than the tape of Example 2, the tape of this example showed a higher internal strength and the adhesive felt firmer to the touch.

Minor amounts of other rubbery polymers may also be added to the cis-polybutadiene to achieve specific objectives. For example, neoprene may be added to improve flame resistance, crude rubber to expedite cure, or polyisoprene to retard cure. Such rubbers, however, should be present only in relatively small amounts, since they tend to reduce the cold weather effectiveness of the finished adhesive. In other words, such rubbers may be added to achieve special effects but should not form a dominant part of the ultimate composition.

EXAMPLE 5

A mill base was formed by milling together over a period of about 45 minutes the following components: 100 parts "Ameripol CB 220"; 15 parts $Al_2O_3 \cdot 3H_2O$ ("Hydral 705," available from Alcoa Chemicals); 1 part 2,5-ditertiary amyl hydroquinone antioxidant ("Santovar A", available from Monsanto Chemical Company); and 35 parts calcium carbonate ("Purecal U," available from Wyandotte Chemical Company). After a smooth blend had been obtained, the mill base was charged to a mogul as in Example 1, and the following components then added: 55 parts "Hercules S-1010," 50 parts "Picco 6120-3," and 20 parts "CKR 1634." After further mixing, 500 parts heptane was added incrementally. When coated on primed polyester film backing, the adhesive prepared in accordance with this example displayed an adhesion to steel of 52 ounces per inch (580 gms./cm.) of width and an initial internal strength value of 209 minutes.

This adhesive was coated on a primed plasticized vinyl film backing of the type described in Example 1 and was found to unwind smoothly from room temperature down to at least −20° F. (−29° C.). The product could be applied at extremely low temperatures and yet functioned effectively at temperatures as high as 105° C. Four hours after coating, the adhesion to steel at 0° F. (−18° C.) was found to be 97 ounces per inch (1,090 gms./cm.) of width. The initial internal strength was found to be 31 minutes, and after aging for 7 days at 150° F. (65° C.), it had increased to over 560 minutes.

The presence of the various filters employed in the adhesive of this example decreases the raw material cost, generally results in a smoother feeling unwind to the user, and improves the strength of the adhesive at high temperature. Against these obvious advantages, however, must be considered the fact that cost was increased somewhat by the addition of a milling cycle, not required with unfilled adhesive formulation.

If desired, the adhesive formulation of this example may be further modified by the addition of vulcanization accelerators, e.g., 10 parts of zinc resinate, such as "Zirex," sold by the Heyden-Newport Company, to reduce the time required for crosslinking in the mogul operation.

EXAMPLE 6

An adhesive was made as described in preceding examples by mixing together the following components:

| | |
|---|---|
| "Ameripol CB 220" | 100 |
| "Hydral 705" | 10 |
| "Picco 6100-3" | 106 |
| "CKR-1634" | 20 |
| Dioctyl phthalate | 6 |

To the formulation was then added 450 parts of heptane, reducing the solids content to 34 and the viscosity to 8,000 cps. at room temperature.

This adhesive was coated on a glass cloth backing filled with cured flexible epoxy resin saturant as taught in Kurka et al. U.S. Patent 3,027,279, and primed with the primer of Example 4 in Bond et al. U.S. Patent 3,129,816, so as to leave a dried adhesive film thickness of 2.2 mils (0.56 mm.). At room temperature this tape had an adhesive to steel of 42 ounces per inch (470 gms./cm.) and an internal strength value of 815 minutes. When spirally wrapped on a ⅛-inch (3.2 mm.) brass rod and placed in an oven at 130° C. for one hour, there was no tendency of the tape end to "flag," or lift.

The adhesive was also coated on a crepe paper backing saturated with a flexible epoxy resin, primed with the primer used in Example 1 hereinabove, and provided with a low adhesion backsize coating of polyacrylate. Adhesion to metal internal strength values were satisfactory at temperatures down to −30° C., although the saturant in the backing became rather stiff.

EXAMPLE 7

To an autoclave equipped with a stirrer were changed the following materials:

| | |
|---|---|
| "Ameripol CB 220" | 100 |
| "Picco 6100-3" | 85 |
| Dioctyl phthalate | 6 |
| Tetra allyloxyethane | 0.5 |
| Dicumyl peroxide | 0.5 |
| Ethanol | 10 |
| Heptane | 500 |

Nitrogen was introduced, the autoclave closed, and steam supplied to heat the contenets to 150° C. and 600 parts of heptane added to reduce the solids content to 15%. Tape made by coating the primed plasticized vinyl backing of Example 1 had 15 ounces (220 gms./cm.) adhesion to steel at low temperatures and an internal strength of 698 minutes. Roll unwind was very smooth. A higher tackifier content would have improved the performance of this tape.

The strength and cold weather properties of adhesives made in accordance with this invention are useful in various other tape constructions. For example, lane marking tape, in which a pressure-sensitive adhesive is adhered to the aluminum foil surface of a foil:vinyl film laminate, is ordinarily almost impossible to adhere to concrete when the temperature is lower than 40° F. (4° C.). Adhesives made in accordance with this invention can be adhered at temperatures well beow freezing, greatly extending the times during which lane marking tapes can be applied.

Example 8

To a mogul mixer was charged 800 parts of "Ameripol CB 220," the steam turned on, and milling caried out for 5 minutes. The steam was then turned off and 80 parts of "Pentalyn H" added. Milling was continued for 15 minutes, and 80 parts of "Zirex" added in 40-part increments 20 minutes apart. After an additional 20 minutes of milling, 400 parts of "Pentalyn H" was added in 80-part increments at 10-minute intervals, the steam being turned on once more. The steam was then turned off and the mill cooled by ciculating water and adding Dry Ice. Next 48 parts of "CKR 1634" was added, steam turned on for 20 minutes, the composition cooled with Dry Ice, and 2500 parts of heptane and 125 parts of ethanol added. The resultant adhesive solution was dark in color but looked smooth.

The adhesion value of the adhesive was found to be 36 ounces per half inch (800 gms./cm.) and the internal strength in excess of 170 minutes. The adhesive was coated on both cellophane and elastomer-saturated crepe paper, the resultant tape products being aggressively tacky with some tendency toward harshness. After conditioning at −40° F. (−40° C.) the adhesion to glass and tin at the same temperature was found to be respectively good and fair. We are aware of no other firm organic-based pressure-sensitive adhesive which displays any adhesion whatsoever at such low temperatures.

What is claimed is as follows:

1. A roll of normally tacky and pressure-sensitive adhesive tape which can be readily unwound at temperatures down to at least −30° C. and which displays an adhesion to steel of at least 1 lb. per inch of width throughout the range of −30° C. to +30° C., and which when applied functions effectively throughout the range of −30° C. to +105° C., comprising in combination a flexible sheet backing having firmly bonded to one face thereof a layer of firm normally tacky and pressure-sensitive rubber-resin adhesive which consists essentially of a reacted blend of 100 parts of rubbery 1,4-polybutadiene having over 95% cis configuration, 60–150 parts of essentially compatible tackifying resin system, and an effective amount of a crosslinking agent for said 1,4-polybutadiene, said adhesive being further characterized by an internal strength value of at least 10 minutes.

2. An electrical insulating tape in accordance with claim 1 wherein the backing is a film formed from a plasticized polymer of monomers including at least a major portion of vinyl chloride.

3. The tape of claim 2 wherein the tackifying resin system is present in the range of 80–110 parts.

4. The tape of claim 2 wherein the tackifying resin system is selected from the class consisting of polyterpenes based on α-pinene, B-pinene, or blends thereof, rosin, hydrogenated rosins, rosin esters, chlorinated polyphenyls, hydrocarbon resins, and mixtures of a plurality thereof, said tackifying resin system being such that, when blended in equal parts by weight with cis-1,4 polybutadiene and coated on polyester film to a thickness of 1.2 mils, the product displays an affinity for steel at room temperature of at least one lb. per inch of width.

5. The tape of claim 4 wherein the tackifying resin system is present in the range of 80–110 parts.

6. The tape of claim 4 wherein the adhesive contains a significant amount of filler.

7. The tape of claim 4 wherein the crosslinking agent is 10–35 parts of phenol-aldehyde resin.

8. The tape of claim 3 wherein a primer layer is interposed between the backing and the adhesive layer.

9. The tape of claim 8 wherein the primer layer consists essentially of (a) a water-insoluble rubbery acrylo polymer, (b) a material selected from the group consisting of a conjugated diene rubbery polymer in the amount of 0.3 to 4 parts per part of said acrylo polymer and a tackifying resin in the amount of from about 0.3 to 10 parts per part of said acrylo polymer, and (c) about 2–30 parts per 100 parts of rubbery polymer present from (a) and (b) in said primer layer of a water-soluble organic wetting agent containing in the molecule thereof a hydrophilic group and a non-linear hydrophobic group.

10. A substrate having as a coating thereon a film of firm normally tacky and pressure-sensitive adhesive which adheres to steel when brought in contact therewith at temperatures as low as −30° C. and which maintains satisfactory adhesion at temperatures as high as 105° C., said adhesive consisting essentially of a reacted blend of rubbery 1,4-polybutadiene having over 95% cis configuration, 60 to 150 parts of essentially compatible tackifying resin, and 10 to 35 parts of a phenol-aldehyde resin.

References Cited

UNITED STATES PATENTS

| | | | |
|---|---|---|---|
| 2,947,710 | 9/1960 | Frantz | 260—845 X |
| 3,032,438 | 5/1961 | Gaynes et al. | 117—138.8 X |
| 3,129,816 | 4/1964 | Bond et al. | 117—122 X |
| 3,275,614 | 9/1966 | Pampus et al. | 260—845 X |
| 3,300,426 | 1/1967 | Hunsucker | 260—845 X |
| 2,551,600 | 5/1951 | Holland et al. | 117—122 X |

WILLIAM D. MARTIN, *Primary Examiner.*

B. D. PIANALTO, *Assistant Examiner.*

U.S. Cl. X.R.

117—76, 122, 138.8, 161; 260—845